United States Patent
Kleinau et al.

(10) Patent No.: US 6,548,975 B2
(45) Date of Patent: Apr. 15, 2003

(54) STALL DETECTION AND THERMAL PROTECTION OF VEHICULAR SYSTEMS HAVING AN ELECTRIC MOTOR

(75) Inventors: Julie Ann Kleinau, Bay City, MI (US); Ashok Chandy, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/896,704

(22) Filed: Jun. 29, 2001

(65) Prior Publication Data

US 2003/0001533 A1 Jan. 2, 2003

(51) Int. Cl.$^7$ ............................................. H02K 17/32
(52) U.S. Cl. ....................... 318/434; 318/430; 318/432; 318/433
(58) Field of Search ................. 318/430, 432, 318/433, 434; 361/31

(56) References Cited

U.S. PATENT DOCUMENTS

| | | | |
|---|---|---|---|
| 4,535,378 A | 8/1985 | Endo | |
| 4,937,719 A | 6/1990 | Yamada et al. | |
| 4,980,624 A | * 12/1990 | Bernhardt | 318/434 |
| 5,869,752 A | 2/1999 | Klauber et al. | |
| 6,166,502 A | 12/2000 | Pattok et al. | |

* cited by examiner

*Primary Examiner*—Khanh Dang
(74) *Attorney, Agent, or Firm*—Edmund P. Anderson

(57) ABSTRACT

A vehicular system includes a controller and an electric motor in signal communication with the controller for receiving current and rotating at speed; while the controller includes a first function responsive to a signal indicative of the speed of the electric motor, a filter responsive to a signal indicative of the heat generation rate of the vehicular system, a second function in signal communication with the first function and the filter, and a limit calculation function in signal communication with the second function for providing a motor current limit responsive to the second function; wherein a method for controlling the vehicular system includes receiving a signal indicative of the heat generation rate of the vehicular system, receiving a signal indicative of a speed of the electric motor, providing a scale factor or an overload value in response to the received signal indicative of speed, filtering the received signal indicative of heat generation rate in correspondence with a time constant, processing the filtered signal by executing a multiplication by the scale factor or a comparison with the overload value to produce a signal indicative of compliance with a duty cycle requirement, and calculating a motor current limit in correspondence with the processed signal to thereby protect the system from thermal overload while maximizing its performance.

21 Claims, 5 Drawing Sheets

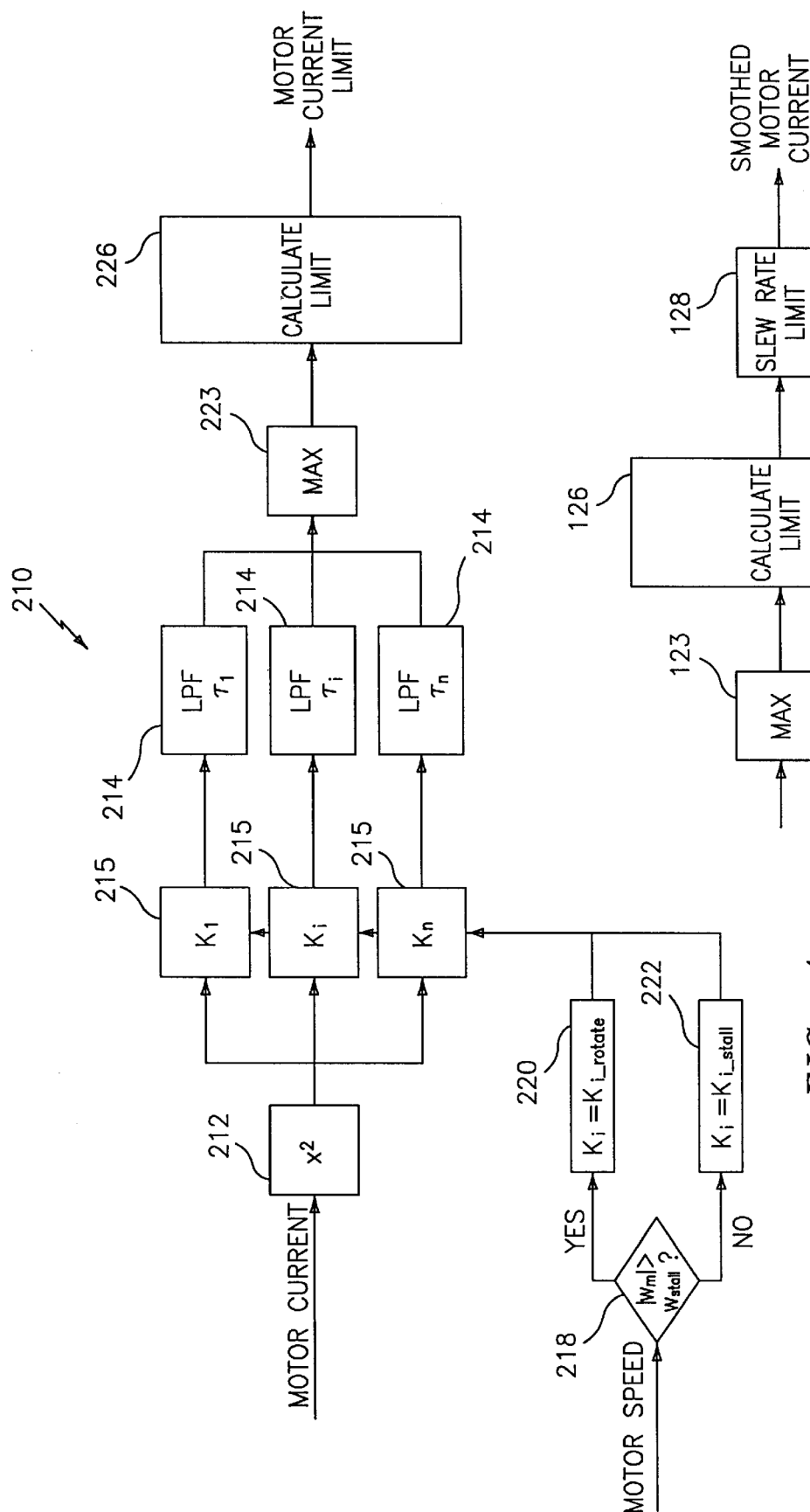

STALL DETECTION AND THERMAL PROTECTION OF VEHICULAR SYSTEMS HAVING AN ELECTRIC MOTOR

BACKGROUND

In a vehicle equipped with an electric power steering ("EPS") system, for example, the steering assist torque is provided by an electric motor that is typically coupled to a steering column or shaft. Electric motors and their control circuits and devices generate heat at a rate that increases with operating current, and are thus designed to operate within design limits chosen to prevent damage due to thermal overload. Electric motors used in vehicular systems are subject to a wide range of loads for highly varying periods of time. For example, the electric motor in a vehicular electric power steering system may require only 15 Amperes ("A") of electrical current for long periods of time such as for continuous operation, but may require 75 A of current for shorter periods such as up to about 5 seconds.

One type of approach is exemplified by U.S. Pat. No. 6,166,502 to Pattok et al., which shows a protection method for such a motor that limits a motor control parameter such as the motor operating current to the highest expected value (e.g., 75 A). Unfortunately, this type of approach does not provide different levels of protection for different motor speeds and generally requires that the motor and control circuit be designed to accommodate such loads for a worst-case motor speed. Such a motor and control circuit are greatly over-designed for normal use and thus unacceptably large, heavy, and inefficient for competitive market applications.

It is also known to use thermal sensors such as thermistors to directly measure temperature in a current limiting system. However, such sensors have drawbacks including generally slow response, calibration overhead and difficult placement.

SUMMARY

The above described and other features are exemplified by the following Figures and Description in which a vehicular system is disclosed that includes a controller and an electric motor in signal communication with the controller for receiving current and rotating at speed; while the controller includes a first function responsive to a signal indicative of the speed of the electric motor, a filter responsive to a signal indicative of the heat generation rate of the vehicular system, a second function in signal communication with the first function and the filter, and a limit calculation function in signal communication with the second function for providing a motor current limit responsive to the second function; wherein a method for controlling the vehicular system includes receiving a signal indicative of the heat generation rate of the vehicular system, receiving a signal indicative of a speed of the electric motor, providing a scale factor or an overload value in response to the received signal indicative of speed, filtering the received signal indicative of heat generation rate in correspondence with a time constant, processing the filtered signal by executing a multiplication by the scale factor or a comparison with the overload value to produce a signal indicative of compliance with a duty cycle requirement, and calculating a motor current limit in correspondence with the processed signal to thereby protect the system from thermal overload while maximizing its performance.

BRIEF DESCRIPTION OF THE DRAWINGS

Referring now to the Figures wherein like elements are numbered alike:

FIG. 4 is a schematic diagram for an alternate embodiment portion of the controller of FIG. 1;

FIG. 5 is a schematic diagram for an alternate embodiment portion of the controller of FIG. 1.

DESCRIPTION OF PREFERRED EMBODIMENTS

Figure 1:
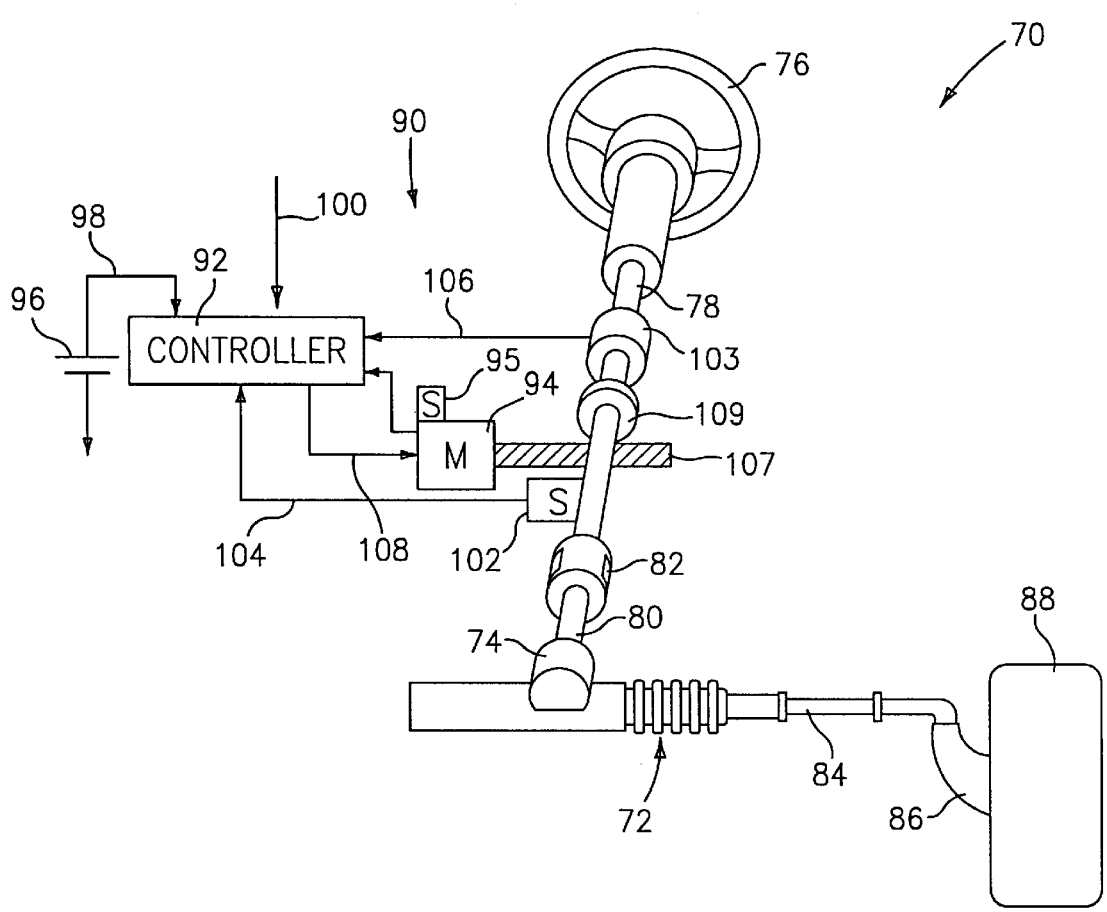
FIG. 1 is a schematic diagram of an electric power steering system having a thermal protection controller.

Referring to FIG. 1, reference numeral 70 generally designates an electric power steering ("EPS") system for a motor vehicle. A steering mechanism 72 is a rack-and-pinion type mechanism that includes a toothed rack (not shown) and a pinion gear (also not shown) located under a gear housing 74. A steering wheel 76 is coupled to an upper steering shaft 78. As the steering wheel 76 is turned, the upper steering shaft 78, which is connected to a lower steering shaft 80 through a universal joint 82, turns the pinion gear. Rotation of the pinion gear moves the toothed rack, which moves tie-rods 84 (only one shown) that, in turn, move steering knuckles 86 (only one shown), which turn wheels 88 (only one shown).

EPS assist torque is provided through an assist unit generally designated by reference numeral 90, which includes a controller 92 and an electric motor 94. A motor position commutation sensor 95 measures the position of the motor 94. The controller 92 is powered by a vehicular power supply 96 through a supply line 98. The controller 92 receives a signal indicative of the vehicle velocity on signal line 100. Initial hand-wheel position is measured by position sensor 102 and fed to the controller 92 through line 104. Position sensor 102 may be an optical-encoding type of sensor, a variable resistance type of sensor, or any other suitable type of position sensor for performing the functions of position sensor 102.

As the steering wheel 76 is turned, the torque sensor 103 senses the torque applied to the steering wheel 76 by a vehicle operator. The torque sensor 103 may include a torsion bar (not shown) and a variable-resistance type of sensor (also not shown) that outputs a signal to controller 92 through line 106 in relation to the amount of twist on the torsion bar. Other suitable torque-sensing devices used with known signal processing techniques will suffice in alternate embodiments.

In response to the inputs on lines 100, 104 and 106, the controller 92 sends a command signal through line 108 to the electric motor 94. The motor 94, in turn, supplies torque-assist to the steering system through a worm 107 and a worm gear 109, in order to provide a steering torque assist to the vehicular steering system in addition to a steering force exerted by the vehicle operator.

Figure 2:
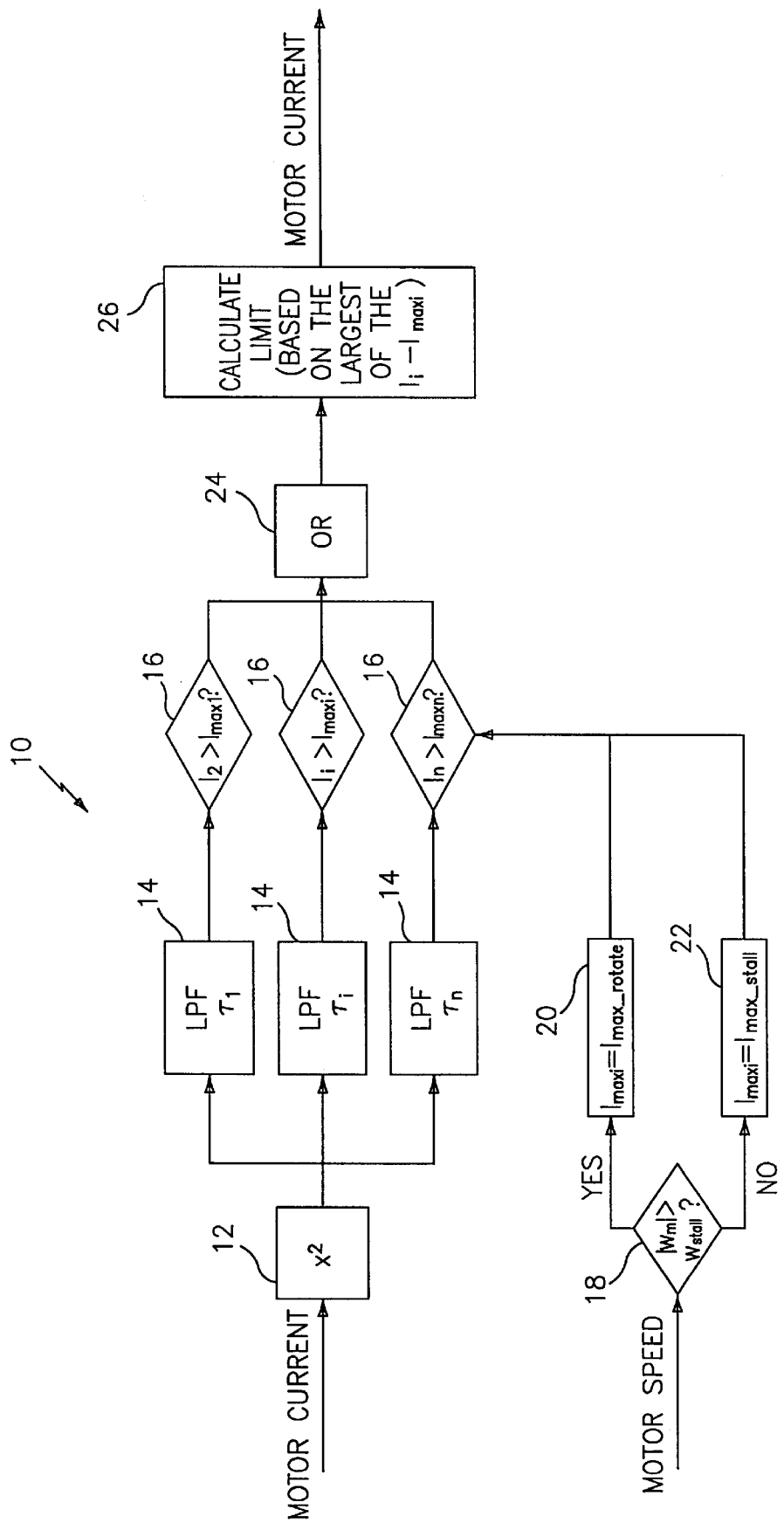
FIG. 2 is a schematic diagram for a portion of the controller of FIG. 1.

As shown in FIG. 2, a motor current limiter is indicated generally by the reference numeral 10. A portion of the controller 92 of FIG. 1 includes the motor current limiter 10. An input signal indicative of the measured or estimated electrical current consumption of the motor 94 of FIG. 1 is received and squared by a squarer 12. The resulting signal is then directed to a plurality of first-order low-pass filters ("LPF") 14, each of which has a different time constant $\tau_i$.

The squared and filtered signals are input, in turn, to a plurality of comparators 16.

As may be recognized by those of ordinary skill in the pertinent art, although thermal systems are generally first order and are thus preferably treated to first-order filters, higher order filters may be substituted in alternate embodiments where they may exhibit performance advantages for applications having unmodeled characteristics.

An input signal indicative of motor speed (i.e., the absolute value of the motor angular velocity) is received by a comparator 18 and compared to a stall speed. If the motor speed is greater than the stall speed, an array of overload values corresponding to the plurality of LPFs 14 is set equal at assigner 20 to an array of maximum values allowable for a motor that is rotating. If on the other hand the motor speed is less than or equal to the stall speed, the array of overload values corresponding to the plurality of LPFs 14 is set equal at assigner 22 to an array of maximum values allowable for a motor that is substantially stalled. The comparator 18 and the assigners 20 and 22 together embody a binary-valued stall-detect vector function. The array of overload values is received, in turn, by the plurality of comparators 16 in a one-to-one correspondence with the plurality of associated LPFs 14.

The array of comparators 16 determine whether any one of the squared and filtered signals received from LPFs 14 exceeds its corresponding overload value. A logical OR 24 enables a limit calculation function 26 if one or more of the array of overload values is exceeded. The limit calculation function 26, in turn, calculates a motor current limit corresponding to the squared and filtered signal that exceeded its overload value by an amount greater than that of each of the other squared and filtered signals. The motor current limit may then be used to limit the current supplied to the motor.

In operation, an implementation of the motor current limiter 10 uses a signal indicative of motor current, which is squared and processed through the plurality of first-order low-pass filters. In this embodiment, the filter rates differ by a factor of ten from filter to filter, with the longest time constant approaching 2000 seconds. The outputs of the filters are then compared to the square of the active duty-cycle requirement. Comparison to the square of the actual requirement obviates the need to take the square root of the filter outputs, and improves throughput. The active duty cycle requirement ("$I_{maxi}$") is either the stall requirement ("$I_{max\_stall}$") or the non-stall requirement ("$I_{max\_rotate}$"). The decision on which requirement is set active depends upon the estimate or measurement of motor speed. The absolute value of this motor speed representation is compared to a calibratable value ("$W_{stall}$").

The calibratable value represents a motor speed value which may be considered the "stall" condition, which is typically slightly greater than zero. Thus, any minor offsets in the measurement do not prevent the stall condition from being detected. When any of the filter outputs exceed the active duty cycle requirement, a limit function is applied to the motor output command to reduce the motor current. When all of the filter outputs fall below the active requirement, the limit function is removed. The limit function is applied in a smooth and gradual manner to prevent abrupt hand-wheel effort changes. Preferably, the amount of limiting is a linear function of the amount by which a filter output exceeds its active requirement.

Figure 3:
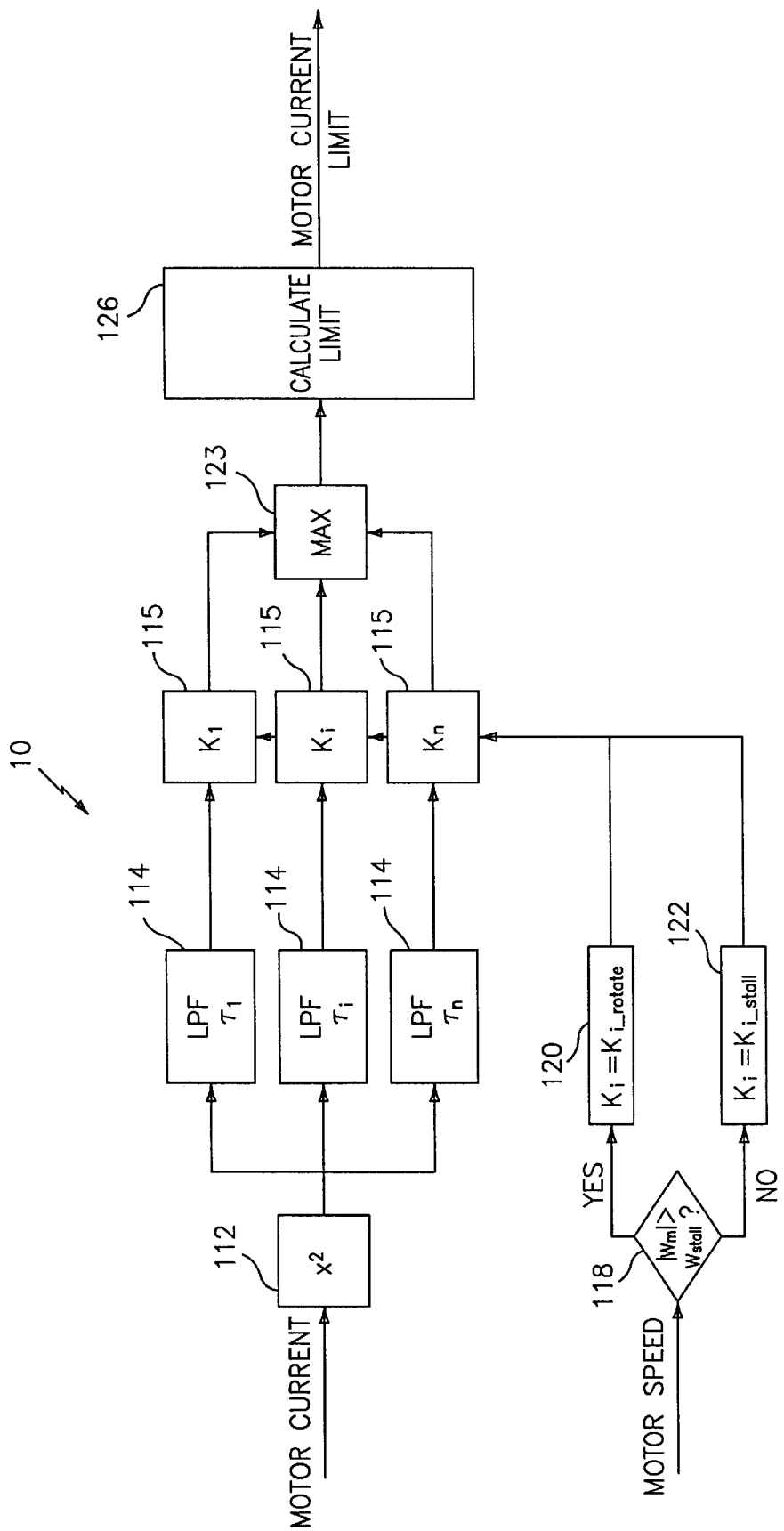
FIG. 3 is a schematic diagram for an alternate embodiment portion of the controller of FIG. 1.

Turning now to FIG. 3, an alternate embodiment motor current limiter is indicated generally by the reference numeral 110. An input signal indicative of actual or estimated motor current is received and squared by a squarer 112. The resulting signal is then fed to a plurality of first-order low-pass filters ("LPF") 114, each of which has a different time constant $\tau_1$. The squared and filtered signals are received, in turn, by a plurality of scaling functions 115.

An input signal indicative of motor speed (i.e., the absolute value of the motor angular velocity) is received by a comparator 118 and compared to a stall speed. If the motor speed is greater than the stall speed, an array of scale factors corresponding to the plurality of LPFs 114 is set equal at assigner 120 to an array of values corresponding to a motor that is rotating. If on the other hand the motor speed is less than or equal to the stall speed, the array of scale factors corresponding to the plurality of LPFs 114 is set equal at assigner 122 to an array of values corresponding to a motor that is substantially stalled. The comparator 118 and the assigners 120 and 122 operate together as a binary-valued stall-detect vector function to produce the scale factors in this embodiment. The array of scale factors is received, in turn, by the plurality of scaling functions 115 in a one-to-one correspondence with the plurality of associated LPFs 114.

The array of scaling functions 115 each multiply a scale factor with a corresponding one of the squared and filtered signals received from the LPFs 114. A maximum function 123 produces a signal indicative of the squared, filtered and scaled signal that is the maximum of all of the outputs of the scaling functions 115. A limit calculation function 126 receives the signal from the maximum function 123 in correspondence with the signal nearest to its limit or exceeding its limit by the greatest value. The limit calculation function 126, in turn, calculates a motor current limit corresponding to the received squared, filtered and scaled signal. The motor current limit may then be used to limit the current supplied to the motor.

In operation, the motor current limit calculation function 110 uses scale factors $K_1$ through $K_n$ to scale the outputs of the low pass filters to a percentage value representing the square of the requirement value for each filter. Thus, all scale factor outputs range from 0–100% squared, and a single maximum function is used to choose the filter representing a particular system thermal time-constant that is showing the worst case usage (i.e., the time-constant that is closest to or exceeds its active requirement). That maximum scaled filter output value is used, in turn, to determine the amount of limiting required from the limit calculation function.

The scale factors represent specific duty cycle requirements where different requirements will generate a different set of scale factors. To adapt from the non-stall requirement to the stall requirement, the scale factors are binary-valued outputs of the stall-detect function.

As shown in FIG. 4, the motor current limiter 210 is similar to the motor current limiter 110, except that the scaling functions 215 here precede the LPFs 214. The motor current limiter 210 reverses the order of the scaling functions and the filters of the current limiter 110 in order to meet design criteria for smoother hand-wheel feel.

With the limiter 110 of FIG. 3, the scale factors $K_1$ through $K_n$ were used in the limiter 110 to scale the outputs of the low pass filters to a percentage value representing the square of the requirement value for each filter. Thus, with the limiter 110, abrupt changes in the scale factors as the motor goes in and out of the stall condition may cause large changes in the limit value. The large changes in the limit value may, in turn, affect the driver effort level when the motor speed moves in and out of the stall condition by causing an abrupt and potentially noticeable change in hand-wheel effort.

To alleviate this behavior, the order of the filters and scaling functions can be reversed to maintain equivalence, since they are both linear functions. The resulting motor current limiter 210 of FIG. 4 smoothes these sudden changes in the scale factor values by running them through the filters, which here follow the scale factors. Smoothing out the scale factor changes means that the motor current limit will change smoothly as well. Compared with the limiter 110 of FIG. 3, this embodiment merely requires a reversal in the order of the filters and their corresponding scale factors, with no additional calculations.

Referring now to FIG. 5, the maximum function 123 and limit calculation function 126 of FIG. 3 are shown with an optional slew rate limiter 128. The slew rate limiter 128 limits the time-rate-of-change of the motor current limit produced by the limit calculation function 126.

In operation, the slew rate limiter 128 resolves the behavior caused by abrupt changes in the scale factors that might otherwise lead to abrupt changes in the motor current limit output. The slew rate limiter may be placed on the output of the limit function 126. The slew rate limiter may also depend on whether the output of the limit function is increasing or decreasing. This prevents sudden changes in the active requirement from causing sudden changes in driver effort levels without smoothing the scale factor transitions at a different rate for each filter.

A slew rate limit on the output of the limit calculation function allows for a different requirement at all filter time constants, and a uniform transition rate in limit values when transitioning in and out of stall conditions no matter which filter output is the highest. The slew rate approach may be used in embodiments where the scaling functions follow the filters.

Figure 6:
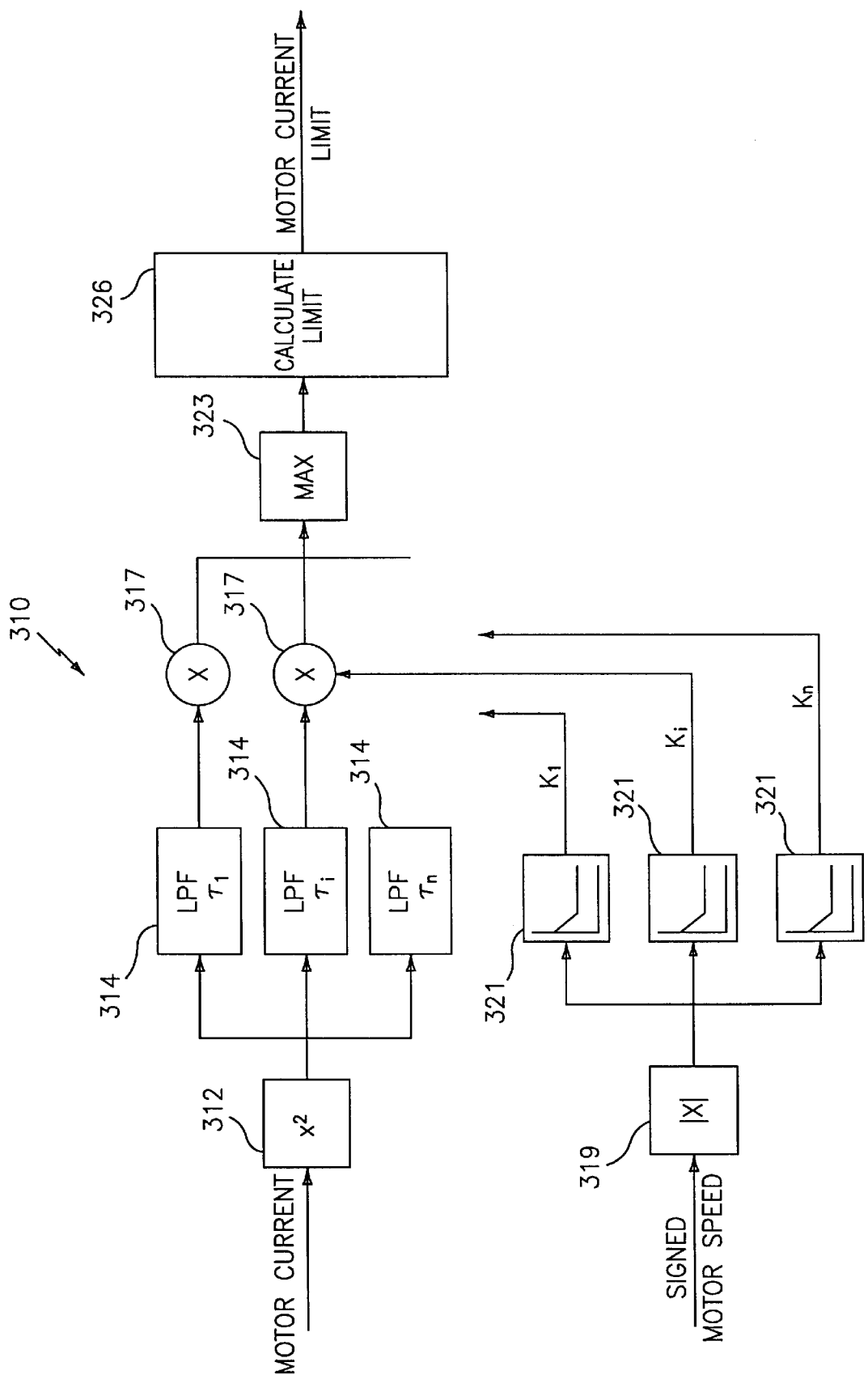
FIG. 6 is a schematic diagram for an alternate embodiment portion of the controller of FIG. 1

Turning now to FIG. 6, the motor current limiter 310 is similar to the motor current limiter 110 of FIG. 3. Accordingly, like features are numbered alike with the substitution of the numeral 3 for that of the numeral 1 in the hundreds position. The motor current limiter 310 differs from that of the motor current limiter 110 in that the comparator 118 and the assignment blocks 120 and 122 have been replaced with an absolute value block 319 and a plurality of speed-sensitive functions 321 that are each substantially smooth functions of motor speed. Thus, the absolute value block 319 and the plurality of speed-sensitive functions 321 together embody a piecewise-continuous speed-sensitive vector function.

An input signal indicative of signed motor speed is received by the absolute value block 319, which, in turn, provides a non-negative signal to the plurality of speed-sensitive functions 321. Each of these speed-sensitive functions corresponds to one of the plurality of associated LPFs 314. A corresponding array of multipliers 317 receives the squared and filtered signals and multiplies each by the value of its corresponding speed-sensitive function. In operation, an advantage of the motor current limiter 310 is that each speed-sensitive function output or scale factor changes smoothly with motor speed between stall speed and a sufficient rotating motor speed.

Thus, the motor current limiter 310 smoothes the motor current limit output by using speed-sensitive functions $K_1(\omega)$ through $K_n(\omega)$ to produce scale factors that are substantially smooth functions of motor speed. The difference from the motor current limiter 110 shown in FIG. 3 is that each scale factor changes smoothly with motor speed between nearly zero motor speed or stall and a predefined rotating motor speed, rather than abruptly changing between two scale factor values.

As may be recognized by those of ordinary skill in the pertinent art based on the teachings herein, the order of the filters and the multipliers for alternate embodiments similar to the motor current limiter 310 may be reversed in the manner employed for the motor current limiter 210 in order to meet design criteria for even smoother hand-wheel feel.

In an embodiment similar to that shown in FIG. 6, a thermistor or other suitable temperature device may be provided to a plurality of substantially smooth scaling functions that are dependent on temperature in addition to motor speed. In addition, the thermistor reading may also be used to provide a rough filter initialization based on temperature when the controller is reset, such as, for example, when the vehicle ignition is cycled on-off-on. Thus, the low-pass filters may be initialized in response to a thermistor reading when the vehicle ignition is turned on.

In operation, these and other embodiments provide a thermal protection scheme that is based upon using a software variable representing motor current, either measured or estimated, squaring that variable or performing other suitable mathematical manipulations in order to provide a signal proportional to the heat generation rate of the system, and passing the signal through a plurality of low-pass filters representing the thermal time-constants in the system. The outputs of these filters are then either compared directly to values representing thermal duty-cycle requirements for the system, or scaled to a percentage of the duty-cycle requirement and compared to that requirement. If the requirement would be exceeded by any of the filter outputs, then the output of a limit calculation function is applied to the motor. When the filter outputs all fall below the requirement, the limit function is removed.

The squaring of the variable representing measured or estimated motor current is performed in order to provide a signal proportional to the heat generation rate of the electric portion of the system. Thus, other mathematical processes may be used or substituted to provide a signal indicative of heat generated, such as, for example, multiplying a voltage drop by the current or dividing the squared voltage by the impedance.

Thus, the motor current is limited based on usage, or duty cycle, without the need to install direct thermal measurement devices in the system to provide thermal protection. Thermal measurement devices add cost and complexity to the system in addition to requiring calibration. The system is tested or validated to the equivalent motor current usage, and the algorithm protects the system from exceeding the specified usage. The motor current limiter provides additional protection to the system by detecting stall conditions and further limiting the current applied to the motor in accordance with the speed of the motor.

When the motor speed is at or near stall conditions, high outputs are not necessary to hold the steering system in place. Therefore, reducing the output level for these conditions may be transparent to the driver. As soon as the motor begins to move, the limit is rapidly removed to allow full motor output for steering assist. This prevents unnecessary heat from being generated in the system, allowing for more steering assist sooner after a stall condition has ended. In the case where components in the design are significantly less capable of sustaining not only high currents in the stall condition, but moderate current levels in the stall condition as well, the above-described and similar embodiments discriminate between stall conditions and non-stall conditions and provide protection against excess heat generation at all current levels.

The detected stall versus non-stall conditions are used to compare the low-pass filter outputs to different duty cycle requirements for the stall and non-stall conditions. The stall duty cycle requirement preferably enforces a lower usage than the non-stall requirement. By utilizing the outputs of the first-order filters in the algorithm, excess amounts of time at stall at even moderate current levels are detected and a corresponding limit function is applied to the motor output. Additional features of certain embodiments prevent sudden changes in the applied motor current when the system transitions in and out of stall conditions.

An advantage of the above-described and other embodiments is the protection provided against having elevated current levels for a substantially stalled motor condition, thus preventing unnecessary heating of the system components, while permitting elevated current levels for limited periods of time for normal rotating motor conditions in order to enhance responsiveness and performance of the EPS system.

Another advantage of embodiments of the present disclosure is the substantial transparency of the assist torque level transitions that provide smooth changes in assist level for transitions in and out of limit conditions when moving in and out of the stall condition.

A further advantage of these and other embodiments is that improved performance and thermal protection is provided by recognizing a stall condition and limiting assist in accordance with both the motor current and the motor speed levels.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A vehicular control system having an electric motor with stall detection and thermal protection comprising:
   a steerable wheel operably connected with a steering mechanism;
   an electric motor operably connected to said steering mechanism;
   a controller in operable communication with said electric motor, said controller executing:
      a first function responsive to a signal indicative of the speed of the electric motor;
      a filter responsive to a signal indicative of the heat generation rate in the vehicular system;
      a second function in signal communication with said first function and said filter; and
      a limit calculation function in signal communication with said second function for providing a motor current limit responsive to said second function.

2. A vehicular control system as defined in claim 1 wherein the signal indicative of the heat generation rate comprises a signal indicative of the current of the electric motor.

3. A vehicular control system as defined in claim 2 wherein the signal indicative of the current of the electric motor comprises a squared current signal further indicative of the rate of heat generation by the electric motor.

4. A vehicular control system as defined in claim 2, further comprising a plurality of filters that are each individually responsive to the signal indicative of the current of the electric motor wherein said filters are low-pass filters having a plurality of different time constants for spanning a range of system thermal time constants.

5. A vehicular control system as defined in claim 4, further comprising a maximum function in receivable signal communication with at least two of said plurality of filters and in transmittable signal communication with said limit calculation function.

6. A vehicular control system as defined in claim 4, further comprising a plurality of second functions responsive to the signal indicative of the speed of the electric motor wherein each of said plurality of second functions corresponds to one of the plurality of different time constants.

7. A vehicular control system as defined in claim 1 wherein said second function comprises a multiplier in signal communication with said first function and said filter.

8. A vehicular control system as defined in claim 1 wherein said first function has at least two possible values corresponding to the signal indicative of the speed of the electric motor when said speed is considered relative to a stall speed.

9. A vehicular control system as defined in claim 1 wherein said second function and said filter each comprise a linear function.

10. A vehicular control system as defined in claim 1 wherein said filter comprises a first-order filter.

11. A vehicular control system as defined in claim 1 wherein said first function is a substantially smooth function of motor speed.

12. A vehicular control system as defined in claim 1 wherein said first function comprises a binary-valued function.

13. A vehicular control system as defined in claim 1 wherein said first function comprises a piecewise-continuous function.

14. A vehicular control system as defined in claim 1 wherein said second function comprises a multiplier.

15. A vehicular control system as defined in claim 1 wherein said second function comprises a comparator.

16. A method for controlling a vehicular system having an electric motor, the method comprising:
   receiving a signal indicative of the heat generation rate in the vehicular system;
   receiving a signal indicative of a speed of the electric motor;
   providing at least one of a scale factor and an overload value in response to the received signal indicative of speed;
   filtering the received signal indicative of heat generation rate in correspondence with a time constant;
   processing the filtered signal by executing at least one of a multiplication by the scale factor and a comparison with the overload value to produce a signal indicative of compliance with a duty cycle requirement; and
   calculating a motor current limit in correspondence with the processed signal.

17. A method as defined in claim 16, further comprising choosing the maximum of a plurality of processed signals to obtain the signal representing the present maximum thermal loading of the system.

18. A method as defined in claim 16, further comprising adjusting a scale factor corresponding to a time constant in response to said received speed signal.

19. A method as defined in claim 16, further comprising filtering a signal corresponding to a motor current limit to smooth the motor current limit slew rate.

20. A method as defined in claim 16, further comprising limiting the current applied to the motor in correspondence with the calculated limit.

21. A system for controlling a vehicular system having an electric motor comprising:

- a steerable wheel operably connected with a steering mechanism;
- an electric motor operably connected to said steering mechanism;
- a means for commanding said electric motor,
- means for receiving a signal indicative of the heat generation rate in the vehicular system in operable communication with said means for commanding;
- means for receiving a signal indicative of a speed of the electric motor in operable communication with said means for commanding;
- means for providing at least one of a scale factor and an overload value in response to the received signal indicative of speed in operable communication with said means for commanding;
- means for filtering the received signal indicative of heat generation rate in correspondence with a time constant in operable communication with said means for commanding;
- means for processing the filtered signal by executing at least one of a multiplication by the scale factor and a comparison with the overload value to produce a signal indicative of compliance with a duty cycle requirement in operable communication with said means for commanding; and
- means for calculating a motor current limit in correspondence with the processed signal in operable communication with said means for commanding.

* * * * *